May 12, 1925.  
D. B. STUCKEY  
SWITCH  
Filed Sept. 4, 1924
1,537,383
2 Sheets-Sheet 1
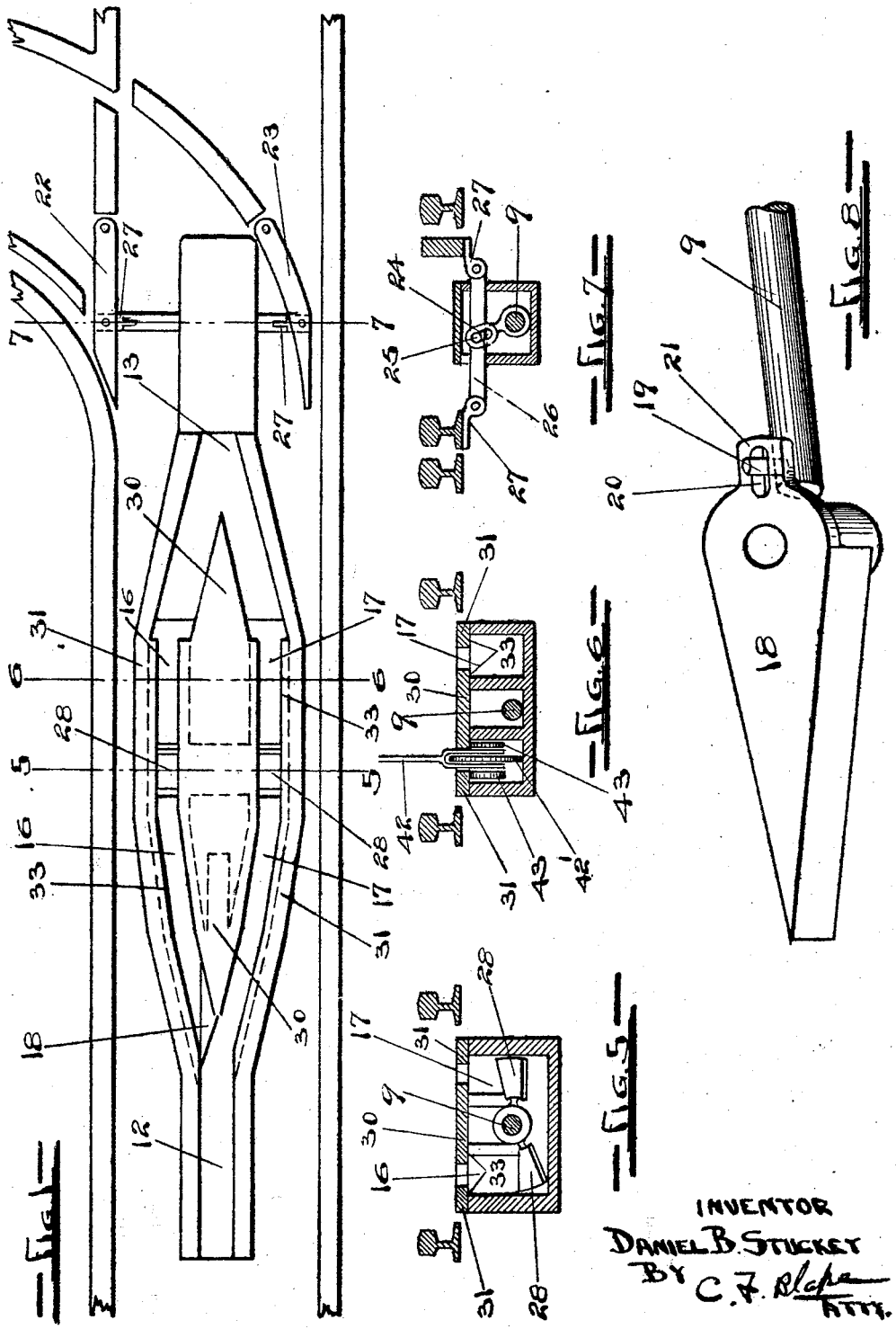

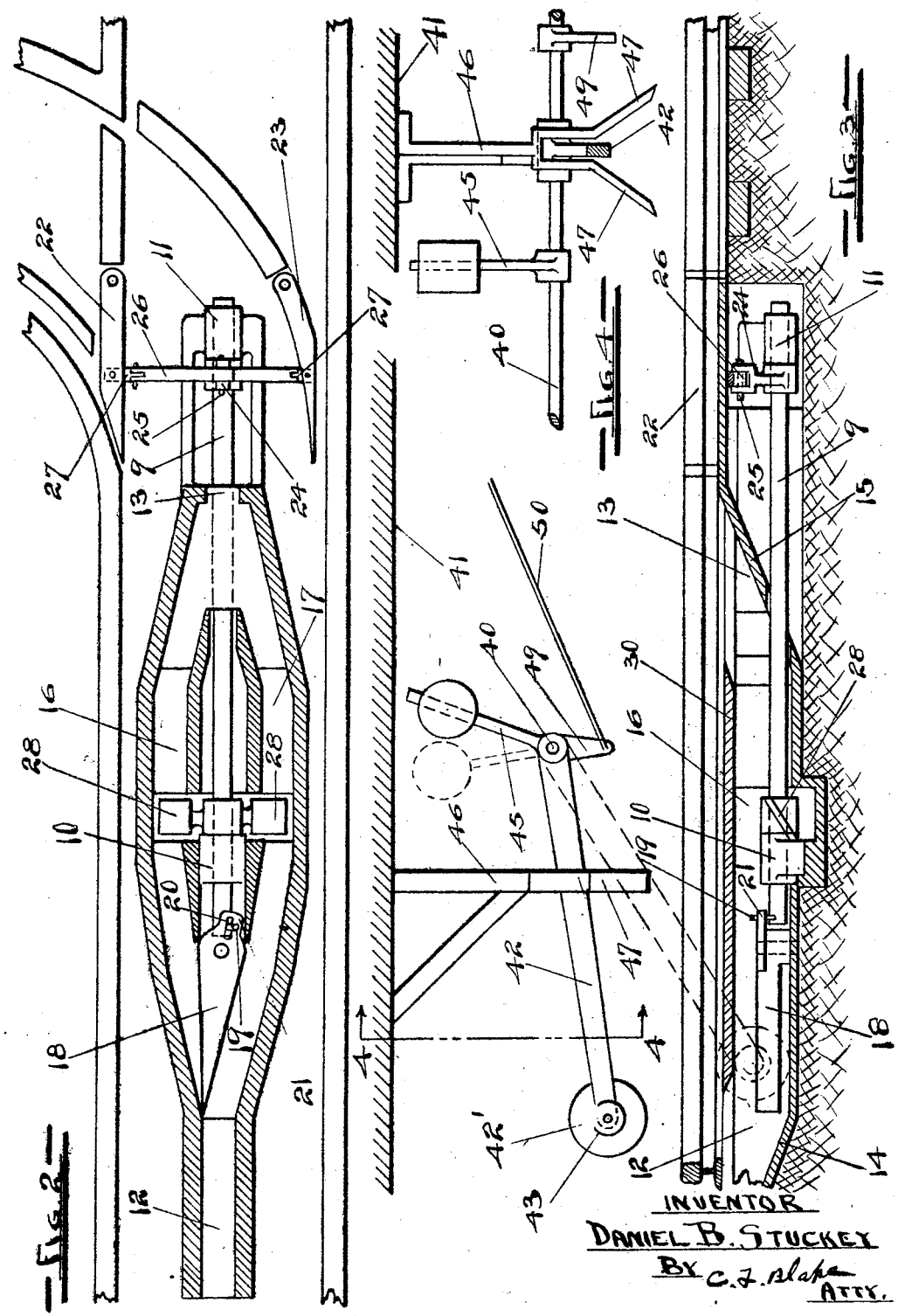

Patented May 12, 1925.

1,537,383

UNITED STATES PATENT OFFICE.

DANIEL B. STUCKEY, OF PORTLAND, OREGON.

SWITCH.

Application filed September 4, 1924. Serial No. 735,865.

*To all whom it may concern:*

Be it known that I, DANIEL B. STUCKEY, a citizen of the United States, residing at Portland, county of Multnomah, State of Oregon, have invented certain new and useful Improvements in Switches, of which the following is a specification.

My invention relates to switches in general, and particularly to rail road track switches, the object being to provide a switch that may be operated by the motorman or engineer from the train as it passes along. I accomplish this object by means of the construction illustrated in the accompanying drawings, which are a part of this application for Letters Patent, like characters of reference indicating like parts throughout the several views thereof, and in which:

Fig. 1 is a plan view of my device.

Fig. 2 is a sectional plan view taken immediately below the cover plates.

Fig. 3 is a sectional elevation of my device.

Fig. 4 is a section upon line 4—4 of Fig. 3.

Fig. 5 is a section upon line 5—5 of Fig. 1.

Fig. 6 is a section upon line 6—6 of Fig. 1.

Fig. 7 is a section upon line 7—7 of Fig. 1.

Fig. 8 is a perspective view of the wheel switch part of my device.

In general my device consists of a shaft intermediate the tracks and parallel thereto with tripping members secured thereupon, connections between said shaft and the track switches, a wheel suspended from the car, a box-like member intermediate the tracks with grooves therein to receive and guide said wheel, over said tripping members, and a switch within said box-like member to determine the course of said wheel through said grooves, said switch being operated from said shaft.

The shaft 9 is journaled at 10 and 11 within the box-like member. Said box-like member is provided with longitudinal grooves or entrances and exits 12 and 13 respectively, the bottoms of said grooves being inclined towards the center of the member as shown at 14 and 15 in Fig. 3. Said grooves divide in the center of said box-like member into side grooves 16 and 17. A switch 18 is pivoted within said box-like member adjacent the entrance groove 12, and serves to guide the wheel suspended from the car into one or the other of the side grooves 16 or 17. Said switch is operated from the shaft 9 by means of a pin 19 in said shaft engaging a slot 20 in the tail 21 of the switch 18, as shown in detail in Fig. 8. The opposite end of the shaft 9 is connected to the track switches 22 and 23 by means of a lever 24 secured upon shaft 9 and having a slotted head adapted to receive a pin 25 in a link 26, which link is pivotally attached to the track switches by clips 27.

Within said box-like member is a pair of tripping members 28 secured to the shaft 9, and located within the side grooves 16 and 17 respectively, as shown in Figs. 1, 2 and 5. Said tripping members are inclined forward in the direction of travel of the car, so that the wheel suspended from the car may travel upon said tripping members without undue jar. Cover plates 30 and 31 are provided, and are mounted upon the box-like member. These cover plates outline the same grooves as are found within said box-like member, but the grooves between said cover plates are narrower than those within said box-like members, so that shoulders 33 are provided as shown in Figs. 1, 5 and 6.

A shaft 40 is supported from the car bottom 41 in any convenient manner, such not being illustrated in the drawings, and a lever 42 is mounted thereupon so as to slide longitudinally upon the shaft but to turn with the shaft. The lower end of said lever is forked, and a wheel 43 is mounted between said forks. Outside said forks and upon the shaft of said wheel 42 are rollers 43, as shown in Figs. 3 and 6. Said rollers are for the purpose of contacting with the shoulders 33 formed by the cover plates 30 and 31 to prevent the rising of the wheel 42 as it passes over the tripping members 28. A counterweighted lever 45 is provided secured to the shaft 40, and is so mounted that it is past the center when the wheel is in either extreme position, raised from the tracks as shown in full lines in Fig. 3, or lowered into the box-like member as shown in dotted lines in Fig. 3. A guide 46 is secured to the car bottom 41, and is provided with spreading legs 47 proportioned to guide the lever 42 downward so that the wheel 42′ will enter the entrance groove 12, and to allow said wheel to then move sidewise into either of the side slots 16 or 17 as determined by the switch 18. A lever 49 is secured upon shaft 40 and a rod 50 connects said lever with suitable operating levers convenient to the operator, such levers not being illustrated in the drawing.

The operation of my device is as follows. In Figs. 1 and 2 the track switches 22 and 23 are shown set to carry a car along the main or straight track, and if an approaching car should go along such track the operator does not lower the wheel 42', but if it is desired that the car should take the curved track the operator lowers the wheel 42' and the guide 46 guides it into the groove 12. As the car passes along the wheel 42' travels down the inclined bottom of said groove 12 as shown at 14 and the lever 42 leaves the guiding portion of the guide 46. When said wheel 42' has reached its lowermost position the rollers 43 engage the shoulders 33 formed by the cover plates 30 and 31. As the car travels the wheel 42' is guided into the slot or groove 17 by by the switch 18, and traveling along said groove it depresses the tripping member 28 therein, thus rotating the shaft 9 and moving the track switches 22 and 23 so as to guide the car into the curved track. Simultaneously the switch 18 is set to guide the wheel 42' of the following car into the groove 16, and the tripping member within groove 16 is raised into position for operation by the wheel 42'. Thus if it is desired that the following car shall pass also upon the curved track the operator does not lower his wheel 42', but if it is desired that such car shall follow the straight track the operator lowers the wheel 42', and said wheel follows the groove 16 and thus trips the shaft 9 to move the track switches 22 and 23 back into the position shown in Figs. 1 and 2.

Thus it will be seen that my device is entirely automatic after the operator has lowered the wheel 42', that there is no electric current required, and that the action is positive, and the direction of the car is determined by the operator without his leaving his post.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. A pair of switches, one being the switch of a railroad track, and the other being a switch intermediate such tracks; a shaft intermediate said tracks and parallel thereto, and connected to each of said switches to operate them simultaneously; tripping mechanism upon said shaft; and a wheel upon a car adapted to operate said mechanism, said wheel being guided by said intermediate switch.

2. In a switch for railroad tracks; a shaft mounted between the tracks and parallel thereto; mechanism connecting said shaft with the track switch to operate the switch from the shaft; a wheel upon a car tripping member upon said shaft; a wheel upon a car adapted to coact with said tripping members; and a switch to guide said wheel, said latter switch being operated by said shaft.

3. In a switch for railroad tracks; a box-like structure having a duality of grooves therein; a wheel upon a car adapted to travel within said grooves; a switch mounted within said box-like structure adapted to predetermine the path of travel of said wheel through said grooves; a track switch; and mechanism within said grooves to cooperate with said wheel to operate said track switch.

4. A pair of simultaneously operated switches; tripping mechanism upon a car guided by one of said switches; a shaft connecting said switches; tripping members upon said shaft to cooperate with said tripping mechanism upon the car to simultaneously operate said switches.

5. In a switch for railroad tracks; a box-like structure intermediate said tracks and having a pair of grooves therein; a switch at one end of said grooves to close one groove and open the other groove; a groove with an inclined bottom leading to said switch; a track switch; a shaft and mechanism operatively connecting said switches to operate them simultaneously; tripping members upon said shaft, one of said tripping members being disposed within each of said pair of grooves; and a wheel mounted upon a car and adapted to travel within said grooves and coact with said tripping members to operate said shaft.

In witness whereof I claim the foregoing as my own I hereunto affix my signature in the presence of a witness at Portland, county of Multnomah, State of Oregon, this 28th day of Aug., 1924.

DANIEL B. STUCKEY.

Witness:
C. F. BLAKE.